United States Patent
Pawar et al.

(10) Patent No.: US 10,624,035 B1
(45) Date of Patent: Apr. 14, 2020

(54) ACTIVATING BEAMFORMING BASED ON UPLINK SIGNAL CONDITIONS

(71) Applicant: Sprint Spectrum LP, Overland Park, KS (US)

(72) Inventors: Hemanth Pawar, Brambleton, VA (US); Krishna Sitaram, Chantilly, VA (US); Shilpa Kowdley, Brambleton, VA (US)

(73) Assignee: Sprint Spectrum L.P., Overland Park, KS (US)

(*) Notice: Subject to any disclaimer, the term of this patent is extended or adjusted under 35 U.S.C. 154(b) by 11 days.

(21) Appl. No.: 15/662,802

(22) Filed: Jul. 28, 2017

(51) Int. Cl.
| H04M 1/00 | (2006.01) |
| H04W 52/14 | (2009.01) |
| H04W 52/24 | (2009.01) |
| H04W 52/26 | (2009.01) |
| H04W 52/36 | (2009.01) |
| H04W 52/28 | (2009.01) |
| H04W 52/34 | (2009.01) |

(52) U.S. Cl.
CPC ....... *H04W 52/146* (2013.01); *H04W 52/241* (2013.01); *H04W 52/243* (2013.01); *H04W 52/265* (2013.01); *H04W 52/281* (2013.01); *H04W 52/34* (2013.01); *H04W 52/367* (2013.01)

(58) Field of Classification Search
CPC ............. H04W 52/146; H04W 52/241; H04W 52/243; H04W 52/265; H04W 52/34; H04W 52/367; H04W 52/245; H03W 52/281

See application file for complete search history.

(56) References Cited

U.S. PATENT DOCUMENTS

| 9,078,220 | B2 | 7/2015 | Makhlouf et al. |
| 9,363,765 | B2 | 6/2016 | Kazmi et al. |
| 2013/0176069 | A1* | 7/2013 | Leong ............ B60R 25/24 327/517 |
| 2018/0131499 | A1* | 5/2018 | Zhang ............ H04L 5/12 |
| 2018/0375550 | A1* | 12/2018 | Zhou ............ H04B 7/0408 |

* cited by examiner

Primary Examiner — Nhan T Le

(57) ABSTRACT

Systems, methods, and processing nodes for activating beamforming based on monitoring uplink conditions of one or more wireless devices attached to a serving access node, wherein the one or more wireless devices are assigned to a high power class and, upon determining uplink conditions meeting a threshold, activating a beamforming transmission mode of the serving access node. The uplink conditions meeting the threshold trigger at least one of the one or more wireless devices to transmit using a high powered transmission mode.

17 Claims, 7 Drawing Sheets

ACTIVATING BEAMFORMING BASED ON UPLINK SIGNAL CONDITIONS

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Op-erating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices (hereinafter referred to as standard or low-powered wireless devices, with the terms "standard" and "low" being equivalent and defined as any power level that is not "high") can be configured with a maximum allowable transmit power level of +23 dBm for frequency bands I-III with a nominal power tolerance of ±2 dB (e.g., for E-UTRA bands). High-power class wireless devices (hereinafter referred to as high-powered wireless device) are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Moreover, as wireless networks evolve and grow, there are ongoing challenges in providing high-quality service to increasing numbers of wireless devices in various coverage areas of a wireless network. For example, beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge. However, there existing methods for activating beamforming are based solely on signal conditions of downlink signals reported by wireless devices, and there is no link between beamforming and a power class assigned to a wireless device.

OVERVIEW

Exemplary embodiments described herein include systems, methods, and processing nodes for activating a beamforming transmission mode of a serving access node based on determining activation of (or conditions warranting activation of) a high-powered transmission mode of a wireless device attached to the access node.

Exemplary methods for activating beamforming in a wireless network include identifying one or more conditions for triggering activation of a high-powered transmission mode of a wireless device attached to a serving access node, wherein the wireless device is assigned to a high power class, and activating a beamforming transmission mode for transmissions from the serving access node to the wireless device.

Exemplary systems for activating beamforming in a wireless network includes a processing node and a processor coupled to the processing node. The processor configures the processing node to perform operations including determining that a high-powered transmission mode for a wireless device attached to a serving access node is activated, wherein the wireless device is assigned to a high power class, and activating a beamforming transmission mode for transmissions from the serving access node to the wireless device.

Exemplary processing nodes for activating beamforming in a wireless network are configured to perform operations including monitoring uplink conditions of one or more wireless devices attached to a serving access node, wherein the one or more wireless devices are assigned to a high power class and, upon determining uplink conditions meeting a threshold, activating a beamforming transmission mode of the serving access node. The uplink conditions meeting the threshold trigger at least one of the one or more wireless devices to transmit using a high powered transmission mode.

DETAILED DESCRIPTION

Figure 1:
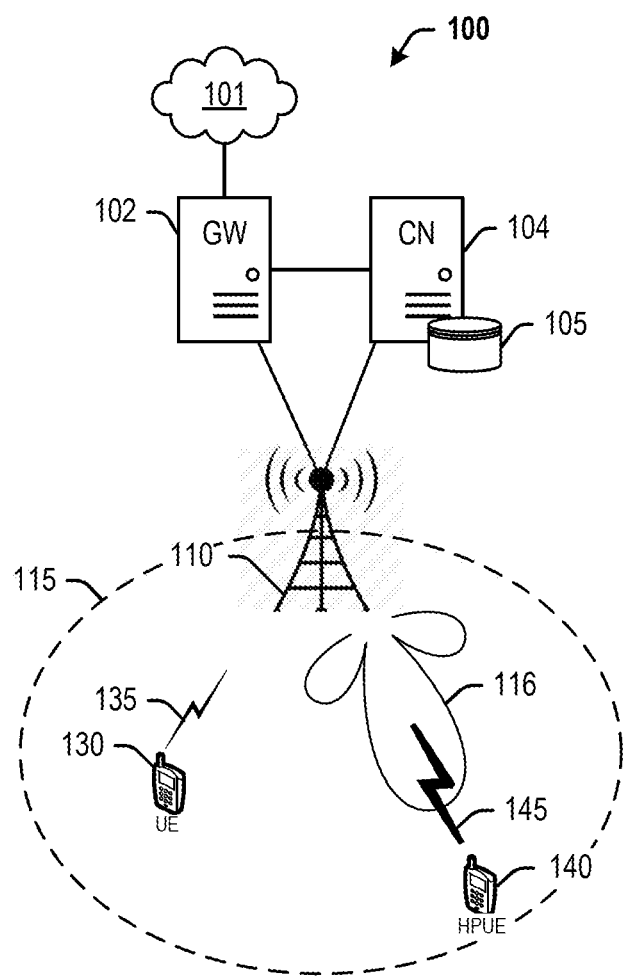
FIG. 1 depicts an exemplary system for activating beamforming in a wireless network.

Exemplary embodiments herein disclose methods, systems, and processing nodes for activating beamforming in a wireless network. A wireless device assigned to a high power class may be attached to a serving access node. The high power class enables the wireless device to operate in a high-powered transmission mode, as further described herein. Determining that the wireless device is operating in the high-powered transmission mode can be used to trigger activation of a beamforming transmission mode for the serving access node. In an exemplary embodiment, the high-powered transmission mode may be activated when required. For example, one or more conditions may be satisfied to trigger activation of the high-powered transmission mode of the wireless device. The one or more conditions may be associated with an uplink channel between the wireless device and the serving access node. For example, the one or more conditions comprise signal conditions of an uplink reference signal transmitted from the wireless device, such as a low signal level, or a high noise level. In some embodiments, the uplink channel may utilize the same frequency as a downlink channel between the serving access node and the wireless device. For example, in time-division-duplex (TDD) systems, uplink and downlink channels are divided in the time domain while sharing the same frequency. Thus, poor radiofrequency (RF) conditions on an uplink channel may be indicative of similarly poor RF conditions on the downlink channel.

Therefore, embodiments described herein utilize uplink signal conditions that are typically used for improving the quality of uplink transmissions (by triggering a high-powered transmission mode) to improve the quality of downlink transmissions by triggering a beamforming transmission mode. In other words, upon either determining activation of the high-powered transmission mode or the signal conditions that trigger activation of the high-powered transmission mode, a beamforming transmission mode is activated for transmissions from the serving access node to the wireless device. Further upon determining that the conditions cease to exist or do not warrant operating in the high-powered transmission mode, the high-powered transmission mode may be deactivated. In response, the beamforming transmission mode of the serving access node may also be deactivated in response to determining that the conditions are not met or that the high-powered transmission mode is deactivated.

Further, one or more wireless devices operating in the high-powered transmission mode may cause interference to other wireless devices that are not operating the high-powered transmission mode, such as wireless devices assigned to a lower or standard power class, or wireless devices assigned to the high power class but operating in a standard-powered transmission mode. Interference caused to uplink transmissions from these other wireless devices may affect downlink transmissions received at these other wireless devices. Specifically, certain uplink transmissions include feedback information related to wireless resources, such as hybrid automatic repeat requests (HARD), channel quality indicators (CQI), etc. which, in turn, can lead the serving access node to improperly allocate wireless resources, thereby affecting downlink resources. Moreover, it may be possible that the high-powered transmission mode is activated by default, always on, or has previously been activated and cannot be deactivated for one or more reasons. In these instances, the potential interference caused to these other wireless devices is minimized by activating a beamforming transmission mode for transmissions from the serving access node to these other wireless devices. Since there are finite resources (i.e. number of antennae) available to perform beamforming, the serving access node may be configured to deactivate the beamforming transmission mode for the wireless device operating in the high-powered transmission mode prior to enabling it for the other wireless devices. An evaluation may be performed of where to direct formed beams based on a number and location of different types of wireless devices, including wireless devices operating in a high-powered transmission mode as well as wireless devices operating in a standard or low-powered transmission mode. These and other embodiments are further described below with reference to FIGS. 1-7.

FIG. 1 depicts an exemplary system 100 for activating a beamforming transmission mode in a wireless network. System 100 comprises a communication network 101, gateway 102, controller node 104, access node 110, and wireless devices 130, 140. Access node 110 is illustrated as having a coverage area 115. Wireless device 130 is illustrated as being within coverage area 115 and transmitting uplink data to access node 110 via communication path 135. Wireless device 130 may comprise, for example, a standard-powered communication device. Thus, communication path 135 provides a standard or low-powered communication path for uplink transmissions from wireless device 130. On the other hand, wireless device 140 may be capable of operating in a high-powered transmission mode. As described herein (and further with respect to FIG. 3), such wireless devices are able to communicate with access nodes over longer distances than standard-powered wireless devices such as wireless device 130. For example, wireless device 140 may be assigned a transmit power class that provides a communication path 145 utilizing a higher transmit power than other wireless devices. It should be noted that although only access node 110 and wireless devices 130, 140 are shown in FIG. 1, any number and combination of access nodes and wireless devices is possible within system 100, without any material difference to the operations described herein.

In operation, a determination that wireless device 140 has activated (or needs to activate) the high-powered transmission mode can be used to trigger activation of a beamforming transmission mode for access node 110 (hereinafter, "serving access node"), indicated in FIG. 1 by formed beam 116. One or more conditions may be satisfied to trigger activation of the high-powered transmission mode of wireless device 140. The one or more conditions may be associated with uplink channel on communication path 145 between wireless device 140 and serving access node 110. For example, the one or more conditions comprise signal conditions of an uplink reference signal transmitted from wireless device 140, such as a low signal level, or a high noise level. In this particular embodiment, for instance, wireless device 140 is located at a cell edge of coverage area 115, and therefore enables a high-powered transmission mode for uplink transmission based on, for instance, poor RF conditions reported for uplink transmissions from wireless device 140 to access node 110.

In some systems, the uplink channel may utilize the same frequency as a downlink channel between serving access node 110 and wireless devices 130, 140. For example, system 100 may comprise a time-division-duplex (TDD) systems, wherein uplink and downlink channels are divided in the time domain while sharing the same frequency. Thus, poor radiofrequency (RF) conditions on an uplink channel may be indicative of similarly poor RF conditions on the downlink channel. Therefore, any uplink signal conditions that are typically used for improving the quality of uplink transmissions (by triggering a high-powered transmission mode) may be utilized to improve the quality of downlink transmissions by triggering a beamforming transmission mode for access node 110. In other words, upon either determining activation of the high-powered transmission mode of wireless device 140, or the signal conditions that trigger activation of the high-powered transmission mode, a beamforming transmission mode is activated for downlink transmissions from serving access node 110 to wireless device 140. Further upon determining that the conditions cease to exist or do not warrant operating in the high-powered transmission mode, the high-powered transmission mode may be deactivated. In response, the beamforming transmission mode of serving access node 110 may also be deactivated in response to determining that the conditions are not met or that the high-powered transmission mode is deactivated.

Access node 110 can be any network node configured to provide communication between wireless devices 130, 140 and communication network 101, including standard access nodes and/or short range, low power, small access nodes. For instance, access node 110 may include a macrocell access node, base transceiver station, a radio base station, an eNodeB device, an enhanced eNodeB device, or the like. In an exemplary embodiment, a macrocell access node can have a coverage area 115 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as locations, power class assignments, and transmission mode capabilities of wireless devices 130, 140, so as to enable access node 110 to determine when and where to direct formed beam 116, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110 and communication network 101.

Figure 2:
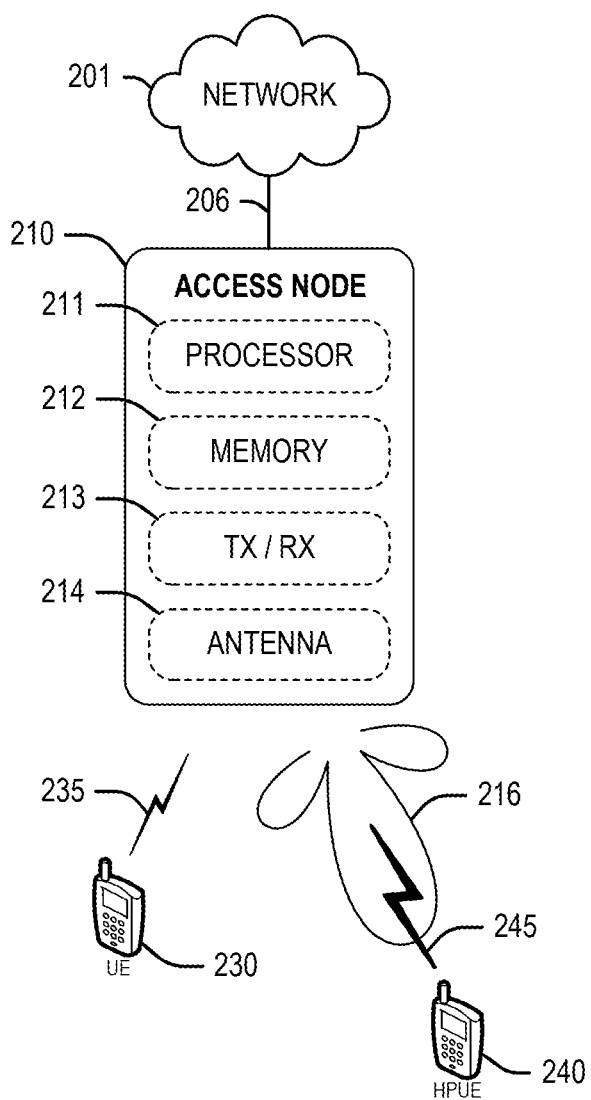
FIG. 2 depicts an exemplary access node.

FIG. 2 depicts an exemplary access node 210 for minimizing interference. Access node 210 may comprise, for example, a macro-cell or a small-cell access node, such as access node 110 described with reference to FIG. 1. Access node 210 provides wireless devices 230, 240 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 230, 240 over communication links 235, 245, respectively. Instructions stored on memory 212 can include instructions for determining that wireless device 240 needs to activate or has activated the high-powered transmission mode and, in response, to activate a beamforming transmission mode utilizing formed beam 216. For example, access node 210 may deploy a radio air interface using TDD, wherein uplink and downlink channels are divided in the time domain while sharing the same frequency. Thus, poor radiofrequency (RF) conditions on an uplink channel may be indicative of similarly poor RF conditions on the downlink channel. Therefore, any uplink signal conditions that are typically used for improving the quality of uplink transmissions (by triggering a high-powered transmission mode) may be utilized to improve the quality of downlink transmissions by triggering a beamforming transmission mode for access node 210. In other words, upon either determining activation of the high-powered transmission mode of wireless device 240, or the signal conditions that trigger activation of the high-powered transmission mode, a beamforming transmission mode is activated for downlink transmissions from access node 210 to wireless device 240. As further described herein and with reference to FIGS. 5 and 6, access node 210 may also generate formed beams for wireless device 230 upon determining activation (or the uplink signal conditions that warrant activation) of the high-powered transmission mode of wireless device 240, in order to minimize interference caused to uplink transmissions 235 from wireless device 230.

Figure 3:
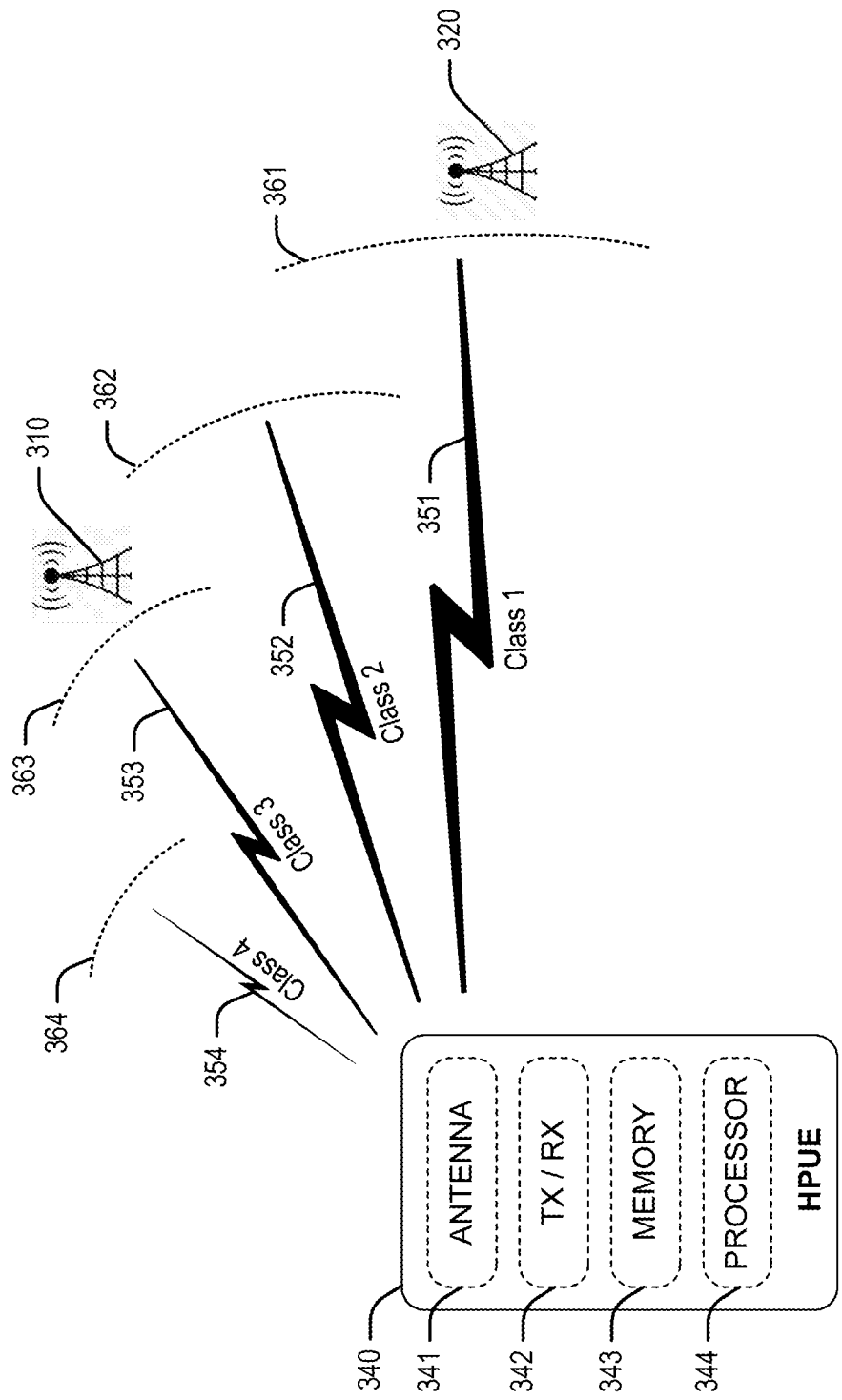
FIG. 3 depicts an exemplary wireless device capable of transmission in several power classes.

FIG. 3 depicts an exemplary wireless device 340 capable of transmission in several power classes. As noted above, wireless devices can be configured as different power class wireless devices (e.g., high-power wireless devices and/or standard-power wireless devices as well as low-power wireless devices). Wireless device 340 is therefore equipped with an appropriate antenna 341 and transceiver 342 enabling increased transmit power from wireless device 340 to one or more access node 310, 320. For example, wireless device 340 is capable of operating in a transmission mode utilizing power class 1, to transmit an uplink transmission 351 at a range 361. Wireless device 340 may further switch transmission modes to utilizing power class 2 to transmit uplink transmission 352 at a range 362, utilizing power class 3 to transmit uplink transmission 353 at a range 363, and utilizing power class 4 to transmit uplink transmission 354 at a range 364. Antenna 341 and transceiver 342 are appropriately configured to utilize these differently-powered transmission modes. Further, an effective coverage area of an access node can be limited by an amount of power available to a wireless device, enabling wireless devices capable of utilizing high-power transmission modes to communicate with access nodes from a longer distance than standard-power wireless devices. In other words, effective coverage areas of access nodes 310, 320 can change dynamically based on a transmit power level of uplink transmissions 351, 352, 353, 354. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 340 may be configured to transmit uplink transmissions 351 utilizing a high-power transmission mode such as power class 1. Alternatively, to enable communication with access node 310 from a short distance, wireless device 340 may be configured to transmit uplink transmissions 351 utilizing a standard-power transmission mode such as power class 3. Moreover, controlling the transmit power level or changing the power class of wireless devices can be performed by setting a maximum uplink transmission power value allowed by the serving access node to be equal to a standard maximum uplink transmission power value, and broadcasting the maximum uplink transmission power value to the wireless device via, for example, a system information message.

Figure 4:
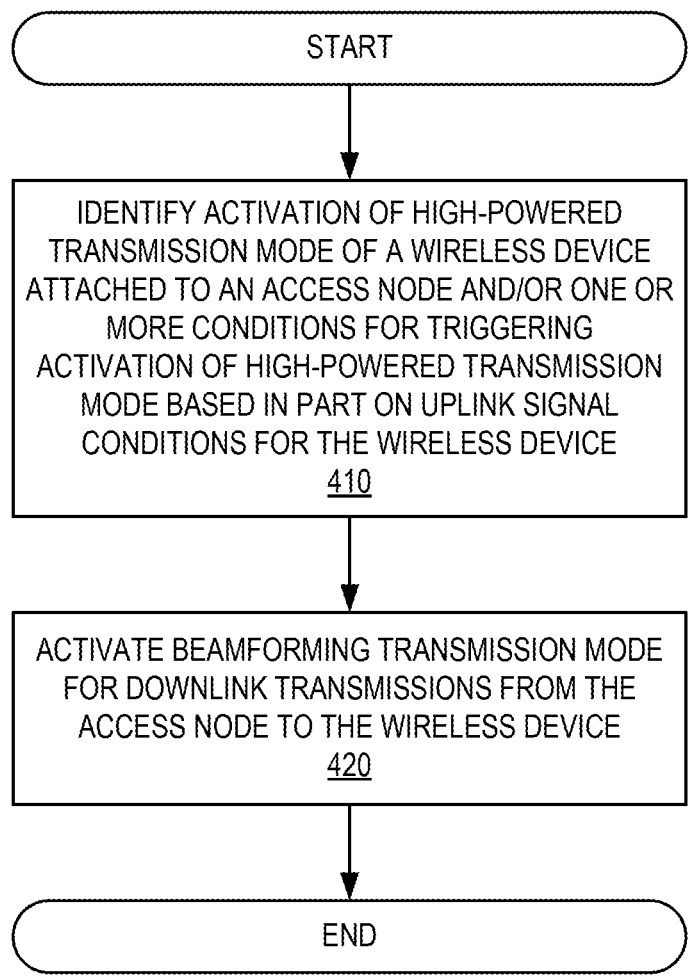
FIG. 4 depicts an exemplary method for activating beamforming in a wireless network.

FIG. 4 depicts an exemplary method for activating beamforming in a wireless network. The method of FIG. 4 may be implemented by an access node such as access node 110, 210, by a controller node such as controller node 104, or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, activation (or conditions triggering activation) of a high-powered mode is identified for a wireless device attached to an access node. For example, a wireless device assigned to a high power class may be attached to a serving access node. The high power class enables the wireless device to operate in a high-powered transmission mode, as further described above with reference to FIG. 3. Determining that the wireless device is operating in the high-powered transmission mode can be used to trigger activation of a beamforming transmission mode for the serving access node. In an exemplary embodiment, the high-powered transmission mode may be activated when required. For example, one or more conditions may be satisfied to trigger activation of the high-powered transmission mode of the wireless device. The one or more conditions may be associated with an uplink channel between the wireless device and the serving access node. For example, the one or more conditions comprise signal conditions of an uplink reference signal transmitted from the wireless device, such as a low signal level, or a high noise level. In some embodiments, the uplink channel may utilize the same frequency as a downlink channel between the serving access node and the wireless device. For example, in time-division-duplex (TDD) systems, uplink and downlink channels are divided in the time domain while sharing the same frequency. Thus, poor radiofrequency (RF) conditions on an uplink channel may be indicative of similarly poor RF conditions on the downlink channel.

Therefore, at 420, a beamforming transmission mode is activated for downlink transmissions from the serving access node to the wireless device. Since the activation of the beamforming mode (or conditions requiring such activation) can indicate poor RF conditions on the downlink channel, these uplink signal conditions may be utilized to improve the quality of downlink transmissions by triggering the beamforming transmission mode. In other words, upon either determining activation of the high-powered transmission mode or the signal conditions that trigger activation of the high-powered transmission mode, a beamforming transmission mode is activated for transmissions from the serving access node to the wireless device. Further upon determining that the conditions cease to exist or do not warrant operating in the high-powered transmission mode, the high-powered transmission mode may be deactivated. In response, the beamforming transmission mode of the serving access node may also be deactivated in response to determining that the conditions are not met or that the high-powered transmission mode is deactivated. Moreover, although conditions for activating the high-powered transmission mode of a wireless device are described herein as triggering activation of the beamforming transmission mode of a serving access node, in an exemplary embodiment, activating the beamforming transmission mode is performed solely in response to activating the high-powered transmission mode of the wireless device, or determining that a wireless device is operating in a high-powered transmission mode.

Figure 5:
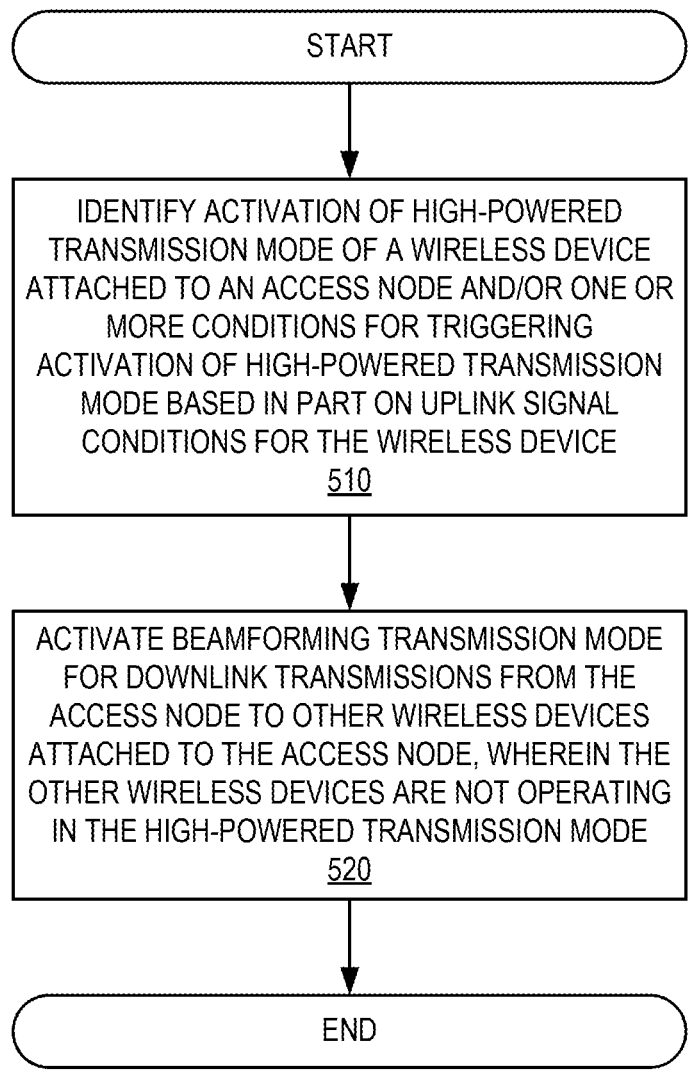
FIG. 5 depicts another exemplary method for activating beamforming in a wireless network.
Figure 6:
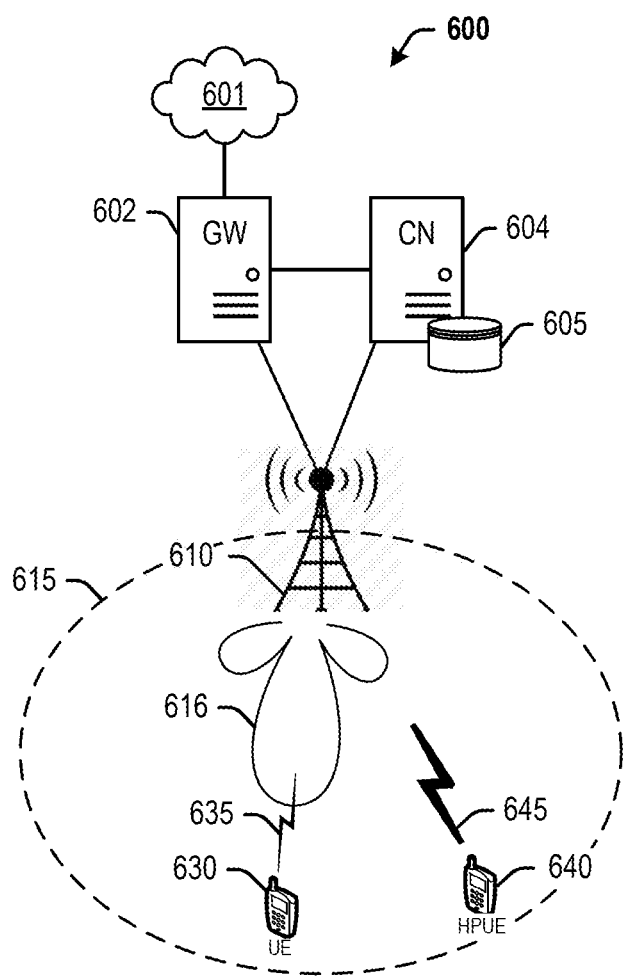
FIG. 6 depicts another exemplary system for activating beamforming in a wireless network.

In another embodiment described herein, one or more wireless devices operating in the high-powered transmission mode may cause interference to other wireless devices that are not operating the high-powered transmission mode, and the beamforming transmission mode is activated for downlink transmissions from a serving access node to these other devices. FIGS. 5 and 6 respectively depict an exemplary method and system for activating beamforming for these other wireless devices. The method of FIG. 5 may be implemented by an access node such as access node 110, 120, 210, by a controller node such as controller node 104, or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, activation (or conditions triggering activation) of a high-powered mode is identified for a wireless device attached to an access node. For example, a wireless device assigned to a high power class may be attached to a serving access node. The high power class enables the wireless device to operate in a high-powered transmission mode, as further described above with reference to FIG. 3. Determining that the wireless device is operating in the high-powered transmission mode can be used to trigger activation of a beamforming transmission mode for the serving access node. In an exemplary embodiment, the high-powered transmission mode may be activated when required. For example, one or more conditions may be satisfied to trigger activation of the high-powered transmission mode of the wireless device. The one or more conditions may be associated with an uplink channel between the wireless device and the serving access node. For example, the one or more conditions comprise signal conditions of an uplink reference signal transmitted from the wireless device, such as a low signal level, or a high noise level.

As described herein, activation of the beamforming transmission mode of a wireless device may cause interference to uplink or downlink transmissions of other wireless devices. Further, interference caused to uplink transmissions from other wireless devices can negatively affect downlink transmissions received at these other wireless devices. Specifically, certain uplink transmissions include feedback information related to wireless resources, such as hybrid automatic repeat requests (HARD), channel quality indicators (CQI), etc. which, in turn, can lead the serving access node to improperly allocate wireless resources, thereby affecting downlink resources. Moreover, it may be possible that the high-powered transmission mode is activated by default, always on, or has previously been activated and cannot be deactivated for one or more reasons.

Thus, at 520, the potential interference caused to these other wireless devices is minimized by activating a beamforming transmission mode for transmissions from the serving access node to these other wireless devices that are not operating in the high-powered transmission mode. Thus, downlink transmissions to these other wireless devices are not affected by the high-powered transmissions from high-powered wireless devices in the network. Moreover, since there are finite resources (i.e. number of antennae) available to perform beamforming, the serving access node may be configured to deactivate the beamforming transmission mode for the wireless device operating in the high-powered transmission mode prior to enabling it for the other wireless devices. An evaluation may be performed of where to direct formed beams based on a number and location of different types of wireless devices, including wireless devices operating in a high-powered transmission mode as well as wireless devices operating in a standard or low-powered transmission mode.

FIG. 6 depicts an exemplary system for activating beamforming in a wireless network pursuant to the method described in FIG. 5. Access node 610 may be considered equivalent to access node 110 in system 100, and wireless devices 630, 640 may respectively be considered equivalent to wireless devices 130, 140 in system 100. For example, access node 610 is illustrated as having a coverage area 615.

Wireless device 630 is illustrated as being within coverage area 615 and transmitting uplink data to access node 610 via communication path 635. Wireless device 630 may comprise, for example, a standard-powered communication device. Thus, communication path 635 provides a standard or low-powered communication path for uplink transmissions from wireless device 630. On the other hand, wireless device 640 may be capable of operating in a high-powered transmission mode. As described herein (and with respect to FIG. 3), such wireless devices are able to communicate with access nodes over longer distances than standard-powered wireless devices such as wireless device 630. For example, wireless device 640 may be assigned a transmit power class that provides a communication path 645 utilizing a higher transmit power than other wireless devices. Other network elements may be present to facilitate communication but are omitted for clarity, such as controllers, gateways, and physical and/or wireless data links for carrying data among the various network elements.

In operation, a determination that wireless device 640 has activated (or needs to activate) the high-powered transmission mode can be used to trigger activation of a beamforming transmission mode for access node 610 (hereinafter, "serving access node"), indicated in FIG. 6 by formed beam 616. One or more conditions may be satisfied to trigger activation of the high-powered transmission mode of wireless device 640. The one or more conditions may be associated with uplink channel on communication path 645 between wireless device 640 and serving access node 610. For example, the one or more conditions comprise signal conditions of an uplink reference signal transmitted from wireless device 640, such as a low signal level, or a high noise level. In this particular embodiment, for instance, wireless device 640 is located at a cell edge of coverage area 615, and therefore enables a high-powered transmission mode for uplink transmission based on, for instance, poor RF conditions reported for uplink transmissions from wireless device 640 to access node 610. It will be appreciated by those having ordinary skill in the art that high-powered transmissions from wireless device 640 can cause interference to wireless device 630 that is operating using a standard transmission power for uplink transmissions, particularly when each of wireless devices 630, 640 utilize the same frequency band or sub-band. Further, interference caused to uplink transmissions 635 from wireless device 630 can negatively affect downlink transmissions received at wireless device 630. Specifically, certain uplink transmissions include feedback information related to wireless resources, such as hybrid automatic repeat requests (HARD), channel quality indicators (CQI), etc. which, in turn, can lead the serving access node to improperly allocate wireless resources, thereby affecting downlink resources. Moreover, it may be possible that the high-powered transmission mode is activated by default, always on, or has previously been activated and cannot be deactivated for one or more reasons.

Thus, access node 610 may be configured to minimize the potential interference caused to wireless device 630 by activating a beamforming transmission mode for transmissions from serving access node 610 to wireless device 630, depicted herein as using formed beam 616. Thus, downlink transmissions to wireless device 630 are not affected by the high-powered transmissions 645 from high-powered wireless device 640. Moreover, since there are finite resources (i.e. number of antennae) available to perform beamforming, serving access node 610 may be configured to deactivate the beamforming transmission mode for wireless device 640 in order to enable transmitting formed beam 616 to wireless device 630. Further, an evaluation may be performed of where to direct formed beams based on a number and location of different types of wireless devices 630 and 640, and other wireless devices operating in a high-powered transmission mode as well as wireless devices operating in a standard or low-powered transmission mode.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, controller node 104, and/or network 101.

Figure 7:
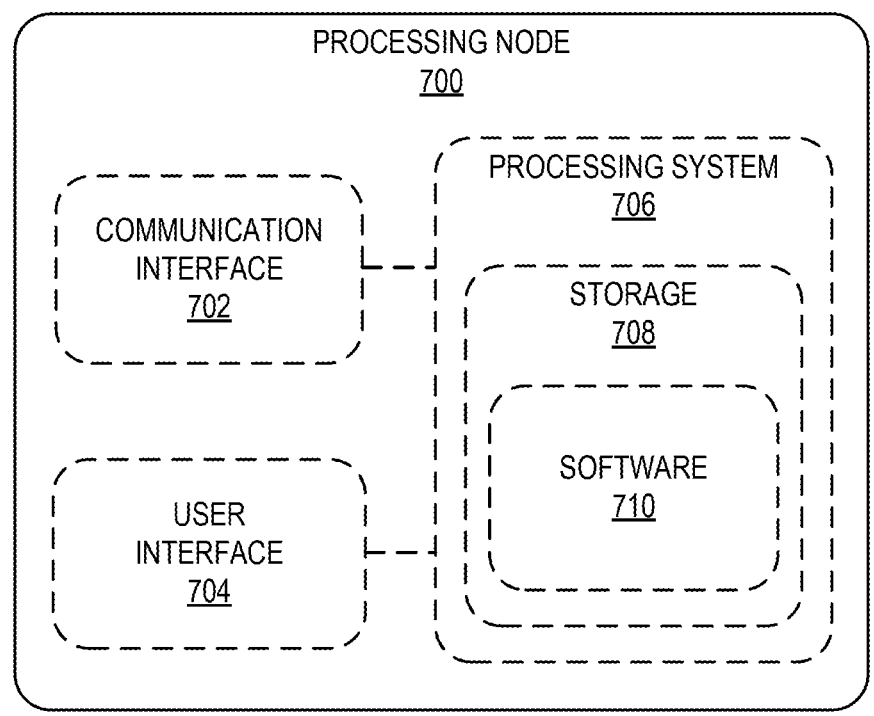
FIG. 7 depicts an exemplary processing node for minimizing interference in a wireless network.

FIG. 7 depicts an exemplary processing node for controlling a transmit power of wireless devices in a wireless network. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmit power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for activating beamforming in a wireless network, the method comprising:
    determining that a high-powered transmission mode of a wireless device attached to a serving access node is activated, wherein the wireless device is assigned to a high power class; and
    responsive to determining that the high-powered transmission mode is activated, activating a beamforming transmission mode for transmissions from the serving access node to the wireless device.

2. The method of claim 1, wherein determining that the high-powered transmission mode is activated is triggered upon identifying one or more conditions associated with uplink transmissions from the wireless device.

3. The method of claim 2, wherein the one or more conditions comprise a low signal level of an uplink reference signal transmitted from the wireless device.

4. The method of claim 2, wherein the one or more conditions comprise a high noise level of an uplink reference signal transmitted from the wireless device.

5. The method of claim 1, further comprising activating the high-powered transmission mode of the wireless device.

6. The method of claim 5, wherein activating the beamforming transmission mode is performed in response to activating the high-powered transmission mode of the wireless device.

7. The method of claim 1, further comprising:
    attempting to deactivate the high-powered transmission mode;
    determining that the high-powered transmission mode cannot be deactivated; and
    activating the beamforming transmission mode for transmissions from the serving access node to a second wireless device attached to the serving access node.

8. The method of claim 7, wherein the second wireless device is assigned to a power class that is lower than the high power class of the wireless device.

9. The method of claim 8, further comprising deactivating the beamforming transmission mode for the wireless device.

10. A system for activating beamforming in a wireless network, the system comprising:
    a processing node; and
    a processor coupled to the processing node, the processor for configuring the processing node to perform operations comprising:
    determining that a high-powered transmission mode for a wireless device attached to a serving access node is activated, wherein the wireless device is assigned to a high power class; and
    responsive to determining that the high-powered transmission mode is activated, activating a beamforming transmission mode for transmissions from the serving access node to the wireless device.

11. The system of claim 10, wherein the operations further comprise identifying one or more conditions for triggering activation of the high-powered transmission mode, the one or more conditions being associated with an uplink channel between the wireless device and the serving access node.

12. The system of claim 11, wherein one or more conditions associated with the uplink channel are indicative of poor conditions on a downlink channel between the serving access node and the wireless device.

13. The system of claim 12, wherein the uplink and downlink channels share the same frequency.

14. The system of claim 13, wherein the serving access node utilizes a time-division-duplexing (TDD) mode of operation.

15. The system of claim 11, wherein the operations further comprise activating the beamforming transmission mode in response to determining the one or more conditions.

16. The system of claim 10, wherein the operations further comprise deactivating the high-powered transmission mode of the wireless device in response to determining that the conditions are not met.

17. The system of claim 16, wherein the operations further comprise deactivating the beamforming transmission mode of the access node in response to determining that the conditions are not met.

* * * * *